Figure 1:
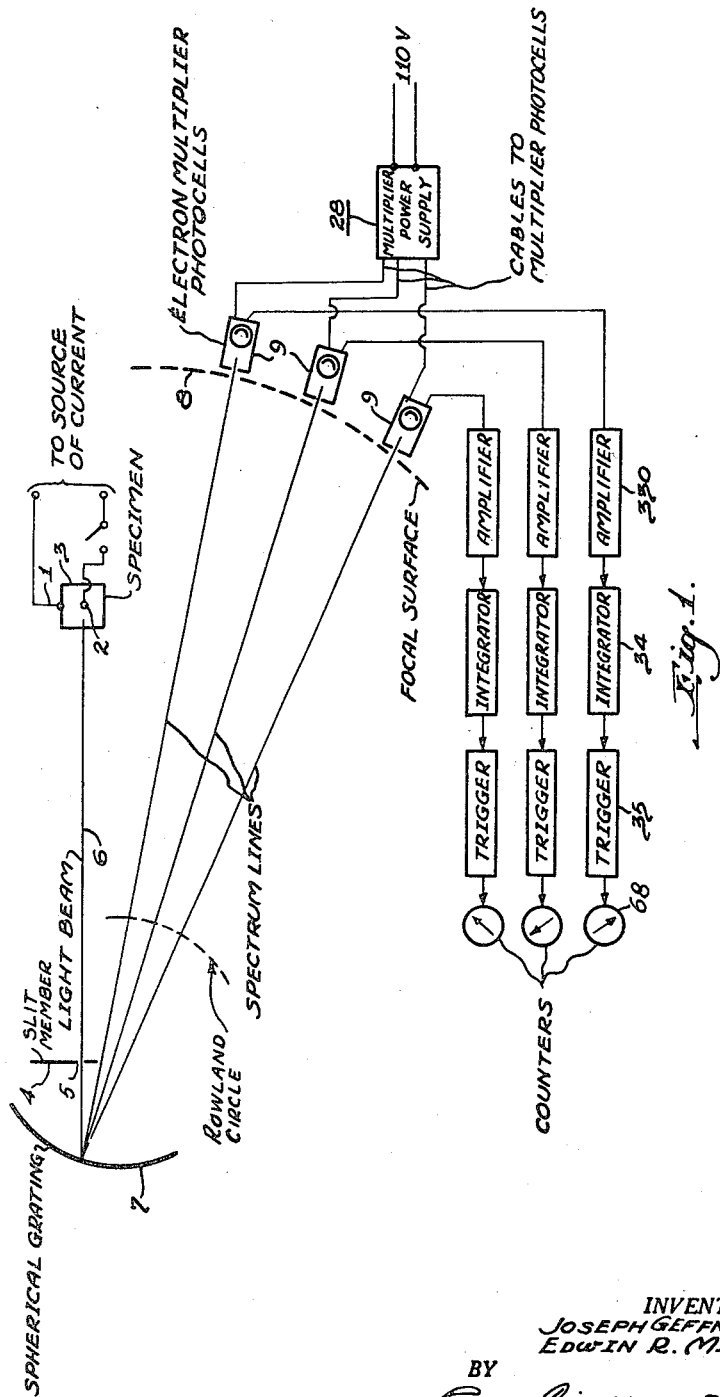

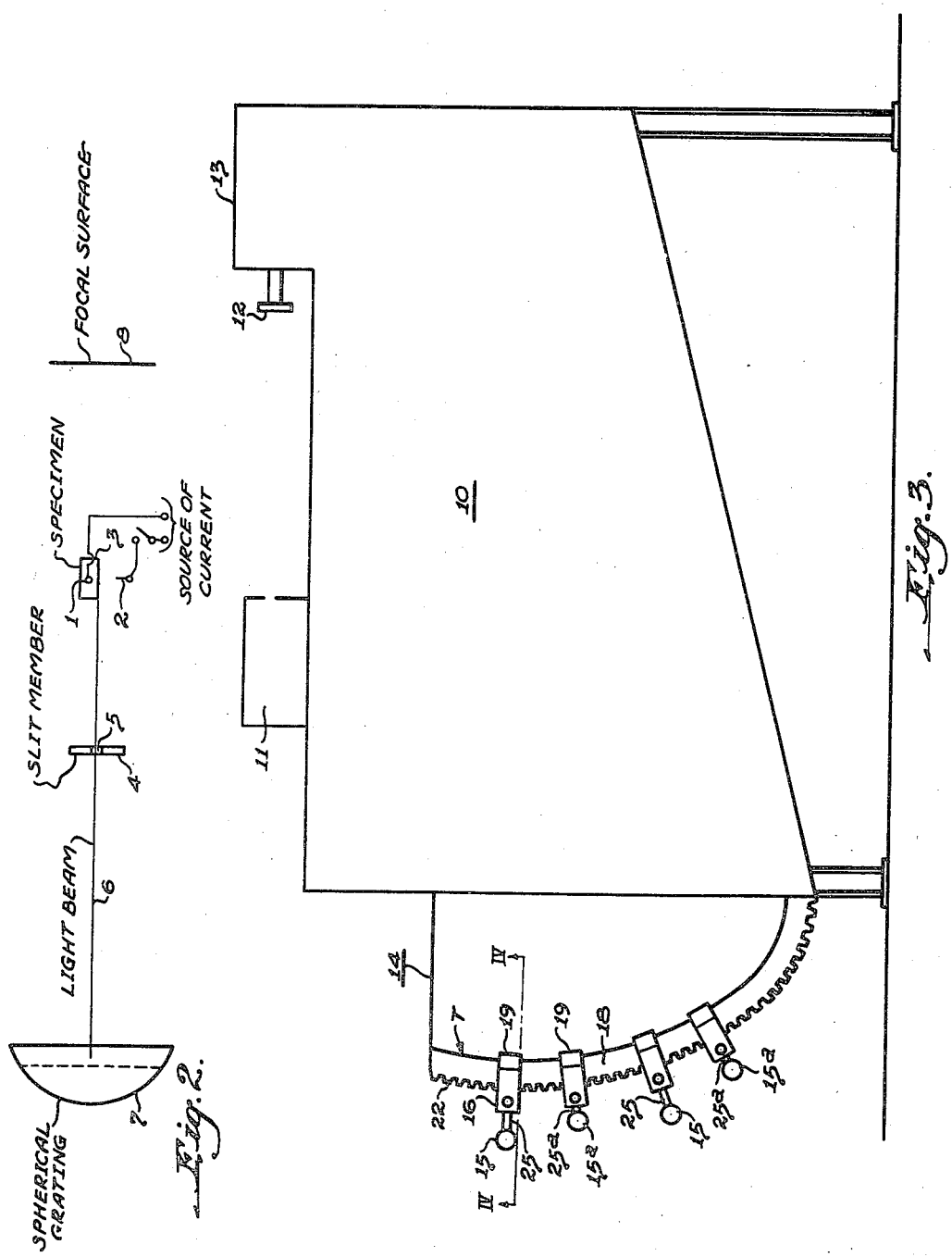

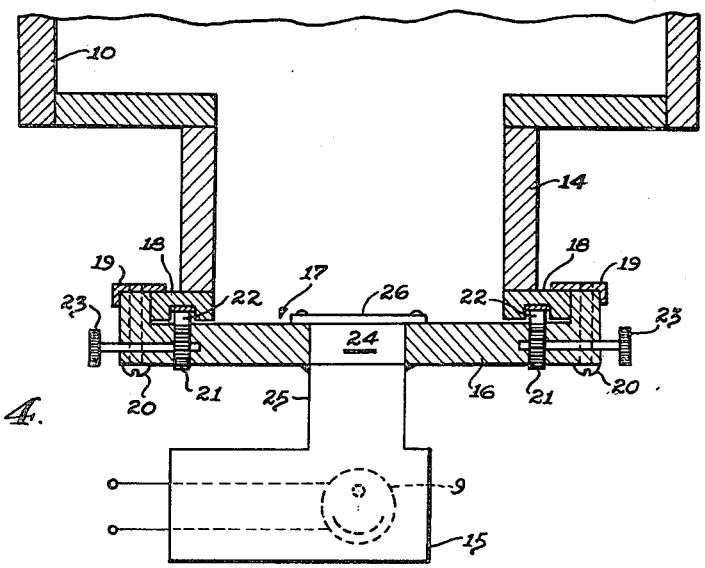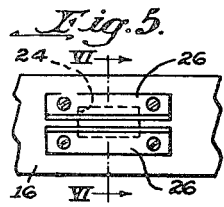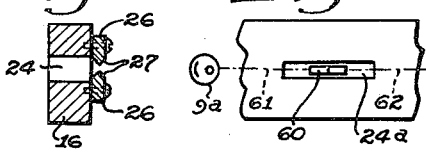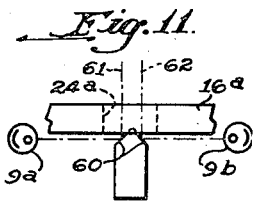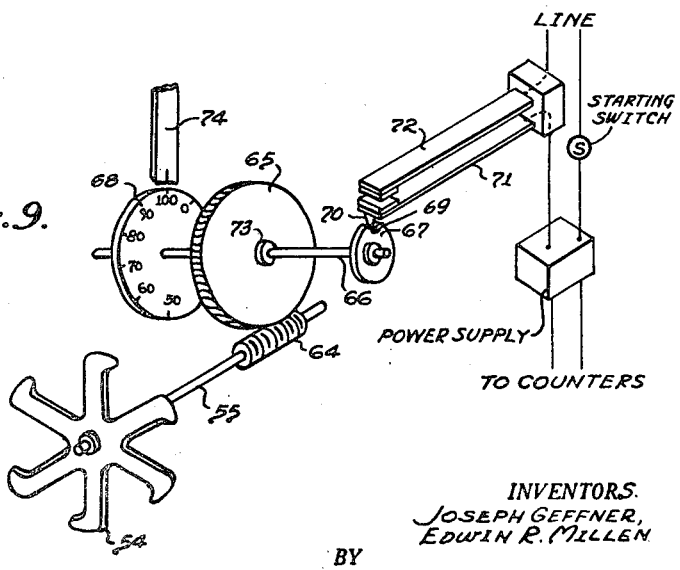

Aug. 10, 1948.    J. GEFFNER ET AL    2,446,874
ELECTRONIC APPARATUS FOR SPECTROGRAPHIC ANALYSIS
Filed May 11, 1944    4 Sheets-Sheet 4

INVENTOR.
JOSEPH GEFFNER,
EDWIN R. MILLEN.
BY
their ATTORNEYS.

Patented Aug. 10, 1948

2,446,874

UNITED STATES PATENT OFFICE 2,446,874

ELECTRONIC APPARATUS FOR SPECTROGRAPHIC ANALYSIS

Joseph Geffner, Weirton, W. Va., and Edwin R. Millen, McCandless Township, Allegheny County, Pa., assignors to Fisher Scientific Company, Pittsburgh, Pa., a corporation of Pennsylvania Application May 11, 1944, Serial No. 535,156

6 Claims. (Cl. 88—14)

This invention relates to spectrographic analysis and to apparatus therefor.

Spectrographic analysis involves the determination of the constituents and amounts of constituents of a material by measurement of the amount of radiant energy which they emit when a sample of the material is excited appropriately, usually thermally or electrically, or both. Such measurements involve separation of the energy emitted by the individual constituents, or elements, by means of a spectrograph which in its customary form comprises a slit for selecting a beam of energy emitted by the excited sample, a light-dispersing element, usually a prism or grating, which disperses the beam of radiant energy into a spectrum and, sometimes with the aid of suitable lenses, brings it to a focus on a surface called the focal surface. In accordance with customary practice the resultant spectrum is then photographed on a film disposed along the focal surface.

The wave lengths of the radiant energy emitted by an excited sample depend upon the elements present in the sample so that appropriate examination of the photographed spectrum, as by comparison with standard spectrograms of pure elements or of samples of known composition, serves to identify the elements present in the sample. In general, and within certain limits, the average intensities of lines of any particular wave length, due to excitation of a particular element in a sample, increase as the percentage of that element in the sample increases, so that quantitative analysis is likewise possible. This involves the measurement of the average intensity of at least one of the spectrum lines emitted by each element desired, i. e., measurement of the optical density of characteristic spectrum lines photographed on the emulsion. This may be accomplished by means of a photocell, as is known, the average intensity which produced the measured line being then determined by referring the measured optical density to a calibration curve relating intensity and optical density for the particular emulsion and particular processing procedure used in developing and finishing the negative. The amount of that element present in the sample can then be determined from data relating intensity to content of element determined from standard samples.

Such a method of analysis is based upon the assumption that percentage concentration of an element is directly proportional to the density of a particular photographed spectrum line of that element, but factors involved in that method introduce inaccuracies. Thus, the density of a particular line is a function not only of the percentage concentration of the element which emits it, but also of (1) the total energy emitted by the sample, which may, and usually does, vary with changes in excitation conditions, (2) the fraction of the total energy traversing the optical system, which involves variations in the location of the excited sample with respect to the optical axis of the instrument, (3) the time of exposure of the emulsion to the spectrum, (4) the sensitivity of the emulsion, which in turn varies with time, temperature and humidity as well as with manufacturing methods, (5) the processing procedure, which is dependent upon such variables as developer concentration, the time and temperature of development, and others.

The effects of these variables may be reduced, but not eliminated, by relating the density of a line produced by a particular element to the density of a line produced by an internal standard element, i. e., one which has an essentially constant percentage in all the samples to be analyzed. Even so, the photographic method, thus briefly described and which has been standard, is open to the further disavantage that it requires a considerable length of time so that it is poorly adapted to such uses as control work, where rapid quantitative determinations are essential. This follows from the fact that the emulsions must be exposed, developed, fixed and dried, the optical densities of the particular lines must then be determined from the negative, and finally the concentrations of the particular elements of the sample must be calculated. Likewise, it requires skilled manipulation and tedious calculations that necessitate careful training and generally require a scientific background.

Because of the possibility of error and of the protracted nature of spectrographic determinations it would be desirable, accordingly, to have available a method of and apparatus for spectrographic analysis which avoids those disadvantages of the photographic procedure.

An object of the present invention is to provide apparatus for spectrographic analysis which measures directly and accurately, without the necessity of photography or a similar intermediary, the energy of spectrum lines produced by dispersion of energy radiated from an excited sample.

Still another object is to provide an apparatus in accordance with the foregoing objects which is simple, applicable generally to all types of spectrographic analysis, can be operated by persons of no technical training, can be made fully automatic, and which occupies less space than the conventional forms of photographic apparatus for this purpose.

A further object is to provide an apparatus for spectrographic analysis which is direct reading and eliminates the calculations that are necessary in making the same determinations by standard photographic procedures.

Other objects will be recognized from the following description.

Figure 8:
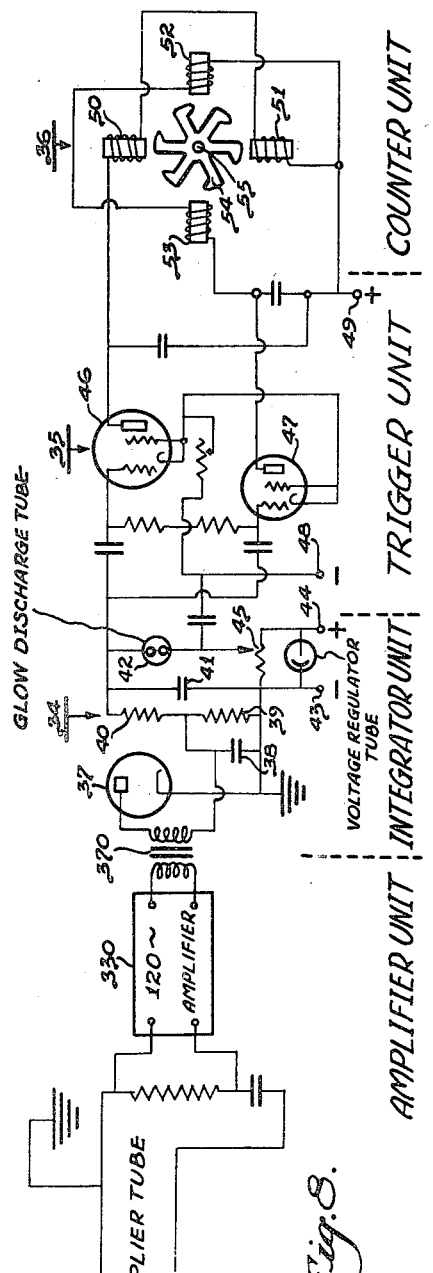
Figure 7:
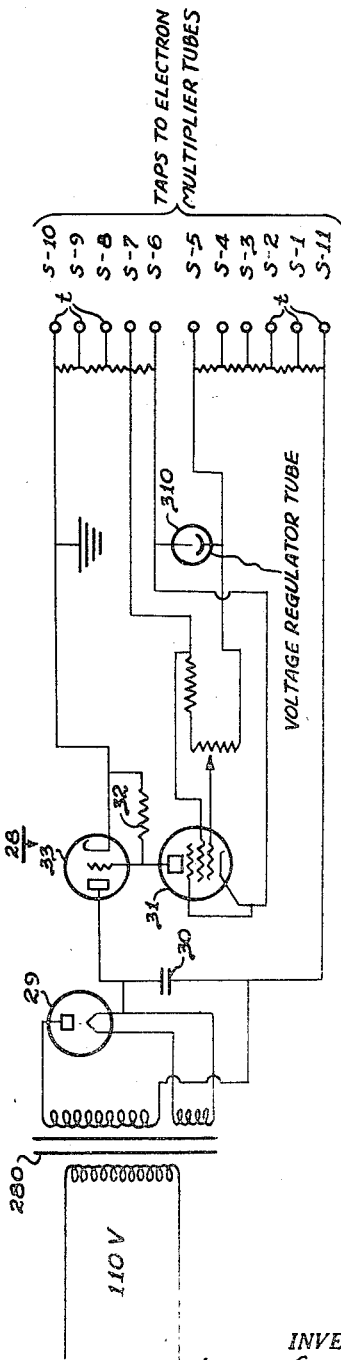

The invention will be described with respect to the accompanying drawings in which Fig. 1 is a schematic side elevation of an apparatus in accordance with the invention; Fig. 2 a schematic plan view of the apparatus shown in Fig. 1, with the photocells and circuits omitted; Fig. 3 a schematic side elevation of an apparatus in accordance with the invention for the purpose of illustrating primarily one mode of associating photocells adjustably with the focal surface; Fig. 4 a sectional view taken on line IV—IV, Fig. 3; Fig. 5 a fragmentary view of the line-selecting means of the photocell carrier shown in Figs. 3 and 4, viewed from inside the apparatus; Fig. 6 a sectional view taken on line VI—VI, Fig. 5; Fig. 7 a wiring diagram of a circuit for supplying power to the photocells; Fig. 8 a wiring diagram of elements which form a part of this invention and act to measure the energy of selected wave lengths emitted by excited samples; Fig. 9 a schematic showing and wiring diagram of means for automatically stopping a determination; Fig. 10 a fragmentary view similar to Fig. 5 showing a modified type of line-selecting means, with photocells indicated schematically; and Fig. 11 a plan view of the structure shown in Fig. 10.

In accordance with this invention, and as has been customary in the art, a sample is excited by appropriate means and a beam of the resulting radiation is passed by a beam-selecting means to a light-dispersing means. Instead, however, of photographing the resulting spectrum and determining the density of lines characteristic of the elements to be determined, the lines to be measured are passed, through line-selecting means located on the focal surface, to photocells which are used to measure directly the intensity of such lines. In the preferred embodiment of the invention this is accomplished by means which will be described with reference to the accompanying drawings.

Having reference first to the schematic showings of Figs. 1 and 2, means are provided for connecting a suitable source of electric current to a pair of electrodes 1 and 2, either or both of which may be the sample 3, such as a block of alloy whose analysis is desired, mounted in a suitable holder. In the embodiment shown one electrode is connected to the sample and the other is spaced from the sample. A member 4, provided with a slit opening 5, selects a beam 6 of the energy emitted by the sample under the influence of an electrical discharge sprung between specimen 3 and electrode 2 and passes it to a light-dispersing means which, in the preferred embodiment and as shown in Figs. 1 and 2, comprises a spherical grating 7.

The grating 7 is so mounted as to direct the resultant spectrum, shown schematically by the spectrum lines in Fig. 1, upon a focal surface 8 which, as shown by the drawings, lies in a substantially vertical plane. This is in contrast with the horizontal optical plane that has been essential with photographic apparatus of this type because of the necessity for having the focal surface convenient to the operator's reach. That is unnecessary in the present invention, and the use of a vertical optical plane results in an important saving of space. Thus, with one particular instrument built in accordance with this invention there is required a floor space of only 8 feet 4 inches by 15 inches, whereas the same instrument with the optical plane horizontal would occupy a space 8 feet 4 inches by about 4 feet. In other words, as compared with the customary mounting required by the necessities of photography, the mounting permitted by the present invention affords a space saving of about 220 per cent.

An important feature of the invention resides in the manner of relating the beam-selecting member 5, the grating 7 and the focal surface 8. Generally speaking, the greater the dispersion in any photoelectric spectrograph, the greater will be the resolving power, and the more useful the instrument becomes.

In virtually all grating spectrographs as made heretofore, the slit and grating are mounted so that they and the focal surface lie on the so-called Rowland circle. In contrast, however, in the present invention these elements are mounted so that the slit lies closer to and the focal surface lies farther from the grating than their Rowland circle positions. In this manner the spectrum is spread out because the dispersion increases in direct proportion to the distance from the grating to the focal surface so that it is unnecessary to use extremely fine gratings or longer focal length gratings to obtain the necessary dispersing and resolving power.

The apparatus provided by the invention includes a plurality of photocells 9, Fig. 1, mounted for adjustment along the focal surface 8, and the photocells take the place, of course, of the camera of conventional instruments. In the embodiment shown adjustment of the photocells is accomplished by providing a track T, Fig. 3, which is so shaped that its outer surface, over which photocell carriages may be moved, positions the photocell slits, described later, exactly on the focal surface of the spectrograph. Fig. 3 represents a side view of such an instrument and it is intended primarily to illustrate the method of mounting the photocells. The apparatus comprises essentially a light-tight box 10 having an enclosure 11 for receiving the sample specimen, a slit member 12 adjustable in width of opening and telescopically mounted for adjustment with respect to a spherical grating carried within a portion 13 of the light-tight box 10. Enclosure 11 is, of course, provided with an opening for emission of the energy from the excited sample. A rearward extension 14 of the box 10 receives the track T which positions the photocell slits on the focal surface.

Although the photocells may be mounted adjustably in various ways, we have found that satisfactory results are to be had by the construction illustrated in Figs. 3 to 6. The photocells 9 are mounted in light-tight containers 15 which are connected rigidly to carriages 16 in the form of metal bars that extend across the opening 17 of the extension 14. The carriages 16 are U-shaped as seen in Fig. 4, with their legs enclosing the outer edges of metallic members 18 which are connected in any suitable manner to the framework of the instrument housing and which form the track T. The carriages may be clamped rigidly in any desired position by clamping angles 19 which are held in place by lock screws 20 which extend through the carriage and into the clamps 19. For ease of adjustment to different positions, there is provided at each end of each of the carriages 16 a pinion 21 which meshes with a rack 22 rigidly connected to member 18, the pinions being rotatable by knurled handles 23 which extend laterally of the carriages. The carriages can be moved by loosening screws 20 and rotating pinions 21 through handles 23, and when in desired position they are locked against movement by tightening screws 20.

Each of the carriages is provided with a bore 24 which is surrounded by the neck 25 of the photocell housing 15 for passing energy of selected wave length to the photocell 9, and the carriage is provided also with a line-selecting means which lies exactly on the focal surface so that when in adjusted position the photocell will receive the energy of a predetermined wave length. In the embodiment of Figs. 4 to 6 this is accomplished by a pair of plate members 26 connected to the inner side of carriage member 16 and extending across opening 24. At their adjacent edges plates 26 are provided with knife edges 27, Fig. 6, for the purpose of isolating the particular relatively narrow band of energy desired from the rest of the spectrum. This serves also to diffract the energy passed through the slit so that the energy tends to cover a maximum area of the cathode of photocell 9. Since the greatest efficiency and accuracy are obtained when the entire cathode surface is illuminated, the cell is mounted far enough behind the slit to effect this, as indicated particularly by Fig. 4. It will be understood that in Fig. 4 the photocell is shown conventionally for clarity of illustration but that in practice the cell will be positioned lengthwise of container 15 so that the cathode will lie parallel to the slit.

Instruments of this type will always embody at least two, and commonly at least 3 or 4 photocells, depending upon the complexity of the material being analyzed or upon the number of elements to be determined. With the cell mounting just described it would accordingly be impossible to bring two carriages closer together than a certain minimum distance prescribed by their dimensions and those of the photocell housings. Consequently, it would be impossible to measure two spectrum lines lying closer together than a certain minimum distance, although that may in some cases be desirable. This difficulty is overcome to a large extent by mounting the photocells as indicated in Fig. 3, which shows an instrument provided with four photocells. Alternate housings 15 are provided with necks 25 which are relatively long, while the other housings 15a have shorter necks 25a. In this way an adjacent pair of carriages may be brought closer together than where all of the cell housings are identical. Thus, in one instrument a series of housings have necks 25 of such length that the photocells are 4 inches behind their slits, while the housings alternating between them have necks of such length that the cells are 3 inches behind their slits. The particular photocells used have sensitive surfaces $\frac{7}{8}$ inch wide and glass envelopes 1⅛ inch in diameter so that in that instrument it is possible to overlap two adjacent photocells until the edge of the envelope of one is just in line with the edge of the sensitive surface of the next, in which position the two cells are at their minimum distance of $\frac{22}{32}$ inch apart. This permits the simultaneous measurement of the energy of lines close enough to each other for most purposes.

Because of the minute amounts of energy involved, the photocells used in the practice of this invention are preferably of the type known as electron multiplier tubes, suitable examples being R. C. A. 931 or C7045. These particular tubes require a constant voltage supply on the order of 1000 to 1200 volts, and their construction is such that any variations in this high voltage power supply are represented in the output by a tenfold magnification of the variation. To obtain output readings consistent to 1 per cent it is thus necessary to regulate the overall voltage variation to within $\frac{1}{10}$ of 1 per cent. Although this may be done in various ways, the majority of circuits for this purpose are either inadequately regulated or apply excessive voltages to the regulator tubes with the result that their life is shortened seriously. Hence we now prefer to use the circuit 28 shown in Fig. 7, which overcomes those difficulties. A high voltage transformer 280 supplies voltage to a diode 29, such as R. C. A. 866, whose rectified output appears across filter condenser 30. A high gain voltage amplifier tube 31, such as R. C. A. 6-J-7, is connected as shown so that a small change in the voltage output of the power supply causes a change in grid bias and a corresponding change in plate current. Since the plate current of tube 31 flows through resistor 32 this change in plate current results in a change of grid bias of a regulator tube 33 whose plate-cathode circuit is in series with the load circuit, represented by a series of taps $t$ corresponding in number to the contact prongs of the photocell. If the output voltage increases slightly the bias on the control tube 31 becomes more positive, which increases the voltage drop across resistor 32 and consequently makes the grid bias of regulator tube 33 more negative. This increases the effective resistance of the regulator tube and causes the output voltage to drop.

Contrasted with standard practice, the essential feature of this circuit is that no attempt is in reality made to regulate the entire output voltage. Since the dynodes of the multiplier cell draw increasingly more current as they progress in order from the photocathode to the collector, rigid control of the overall voltage would result in increasingly severe defocussing action as the voltage steps would become increasingly dissimilar with this action.

The placement of tube 310 (as the reference voltage), which is suitably V. R. 105, requires high bleeder current flow which is large compared to the photo-multiplier currents and makes the step variations introduced by the multiplier currents negligible. The voltage between tubes 310 and 33 is regulated, and since the remainder of the circuit is in series the voltage across the steps S—5 to S—11 is also of necessity regulated.

This displacement of the regulator section from the conventional connections permits using the tubes, particularly 31, at applied voltages which do not exceed greatly the rated voltages under which the tubes normally operate and it thus results in improved performance and longer tube life. The taps shown in Fig. 7 are connected to a panel board in known manner so that each of the photocells 9 receives power from a single jack and cable.

Conditions within the sample excitation system can not be rigidly controlled so that the intensities of the spectrum lines vary during the time of excitation. This introduces a variable in any system of spectrographic analysis but we find that its effect can be reduced to an amount which is inappreciable for all practical purposes by measuring the total energy emitted during a suitable time interval, i. e., by evaluating a time integral of the intensity over such an interval. To this end the output of each photocell is measured over a given time interval by passing it to a channel comprising an amplifier unit 330, an integrator unit 34, and a trigger circuit 35 which actuates a counter 68, one such channel being provided for each photocell, as seen in Fig. 1. The amplifier unit 330 may be any of the various circuits adapted to that end but it should be tuned to the frequency of the light passed to the photocell. With proper excitation of the sample the light reaches the cell at a frequency of 120 cycles per second so that the amplifier should be tuned to the same frequency. In this way microphonic effects and pick up from either internal or external sources are suppressed, thus obtaining more favorable signal-to-noise ratio. Of course, if the sample is excited with D. C. the light will not be modulated but in that event a chopper can be interposed between enclosure 11 and grating 7 to effect desired modulation in accordance with practice known in the art. Inasmuch as the amplifier frequency is tuned to that of the light reaching its photocell the effect of adjusting the amplifier controls is to vary the gain of the amplifier, whereby to provide changes in sensitivity.

The purpose of the integrator unit is to measure over a specific time interval the total energy to which its photocell is exposed, much the same as a watt meter measures the total electrical energy consumed in a circuit with which it is associated. This unit takes the varying electrical output of its photocell and integrates it, and thus it serves the same function as a photographic emulsion to give a summation of the total energy output over a specific time interval so that different runs with a given material are reproducible. While various circuits might be used for this purpose we prefer the integrator unit 34 which is shown in Fig. 8. The alternating current output from amplifier 330 is coupled by a transformer 370 to a rectifier diode 37, such as R. C. A. 6J5, the D. C. output of which is impressed across condenser 38 and resistor 39. This voltage is in turn applied to a neon, or glow, discharge tube 42, suitably G. E. N. E.-2, connected as shown across a resistance 40 and a condenser 41 to constitute a relaxation oscillator whose output frequency varies as a direct function of the voltage across 38—39. The discharge tube 42 then fires at intervals determined by the voltage supplied by 38—39 since this determines the current supplied to the charge condenser 41. The frequency of this relaxation oscillator is determined by the output voltage of amplifier 330 which is in turn determined at any instant by the intensity of the light being measured. The dynamic range of the unit is limited by adjustment of the time constant of 38—39 relative to that of 40—41, and for most purposes we prefer that the time constant of the former shall be several times that of the latter. The striking voltage of tube 42 is about 70 volts so that the lower limit of power measurement ordinarily would be about 5 milliwatts. Therefore, a variable resistance 45 is used to supply initial set biasing potential to neon lamp 42 just below the striking potential, thus enabling the measurement of microwatt power levels.

In one integrator unit that has been used satisfactorily, condenser 38 has a capacity of one microfarad and resistor 39 a resistance of one megohm, while condenser 41 has a capacity of 0.05 microfarad and resistance 40 a resistance of 5 megohms. In this circuit the time constant of 38—39 is one second while that of 41—42 is ¼ second. Biasing voltage, say 70 volts, is supplied to the integrator unit through terminals 43 and 44. This circuit provides, as stated, means for integrating powers of fractional wattage. It is capable of operating over a wide range, e. g., from a lower limit of measurement of a few microwatts to an upper limit of about one-tenth watt. Over this range of operation the output consists of a series of pulses which actuate a counter mechanism that counts and records the number of impulses. By associating with this circuit a standard time interval mechanism to measure accurately the time interval over which the counter is operated there is obtained a direct reading of the total power over the time interval. The output frequency of several such integrator units built for the purposes of this invention has been found by measurement to be an exact linear function of the input voltage or, in other words, the output frequency varies directly as the square root of the input power.

Each pulsation of the integrator unit output represents a certain increment of spectral line energy content. It remains only necessary, then, to count the total number of pulses accurately to have a summation of the spectral line energy over the entire measurement interval. This is accomplished conveniently by passing the output of the integrator to a trigger circuit 35, Fig. 8, which comprises gas filled triode tubes 46 and 47, such as R. C. A. 2050 or 2051. Power, say at 100 volts, is supplied to the trigger unit through terminals 48 and 49. As appears from the circuit shown in Fig. 8, the triodes 46 and 47 form a trigger circuit with the tubes 46 and 47 becoming alternately conductors or non-conductors upon each pulsation from the integrator unit 34. That is, each triode fires on alternate pulses of the neon tube 42.

Although the resultant alternate firing of tubes 46 and 47 may be used in various ways to indicate or count the pulses of the integrator unit, the embodiment shown accomplishes this in a particular way illustrated in Fig. 8. As appears therefrom the counter comprises a pair of geometrically opposed magnets 50 and 51 and a second pair of geometrically opposed magnets 52 and 53 aligned at right angles to and in the plane of magnets 50 and 51. These four magnets thus constitute the pole pieces of a motor which includes a specially shaped rotor 54 mounted on a shaft 55. Magnets 50 and 51 are connected to be energized upon the firing of triode 46 and to be deenergized when triode 47 fires, while magnets 52 and 53 are in turn energized by the firing of triode 47 and deenergized when triode 46 fires. Thus rotor 54 is caused to rotate in stepwise fashion in conformity with the pulsations of the integrator unit. Chattering of the rotor may be eliminated, if need be, by means of a ratchet arrangement or overrunning clutch, not shown. The number of movements of the rotor is indicated by connecting its shaft 55 to a suitable counting mechanism, as will be well understood, such as dials 68, Figs. 1 and 9.

The rotor is specially constructed as seen in Fig. 8. It comprises a spider having six equally spaced arms which are uniformly extended at their ends to provide shoulder portions that progressively decrease in cross sectional area to a sharp nose, as shown. In this way the magnetic reluctance of the rotor increases for rotation in one direction and decreases for rotation in the other direction. The result is that, as seen further from Fig. 8, when two aligned arms are aligned with a pair of the magnets, the next adjacent pair of aligned arms in the direction of rotation lie with their noses closely adjacent to the other pair of magnets, which will be energized next, i. e., close to magnets 52 and 53 in the drawing. Thus, when triode 47 fires the rotor is positively caused to move in clockwise direction, there being little tendency for it to rotate counterclockwise. When tube 47 has fired the arms which are at 60°–240° in Fig. 8, will have moved so that they are in alignment with magnets 52 and 53 and at the same time the arms which are at 120°–300° in Fig. 8, will have been moved so that their noses lie adjacent to magnets 50 and 51 for being drawn into alignment therewith the next time triode 46 fires.

In the use of the apparatus described a film or other suitable emulsion used for spectrographic analysis is positioned along the track which forms the focal surface, an appropriate sample is excited and the emulsion is exposed in accordance with standard practice in the art. This spectrogram gives a scale for positioning the photocell carriages in the continued use of the apparatus provided by the invention. In making an analysis, then, the carriages are moved so that the slits of the photocells admit the desired spectral energy, whereupon the sample is excited with power supplied to the various units.

For direct reading, without the necessity for extended computation, the instrument is operated as follows. Assuming that samples of aluminum-copper alloys are to be analyzed for copper, one photocell carriage will be set to measure an appropriate copper line and another will be set to measure an aluminum standard line. The sample, excitation and exposure conditions as well as the optical alignment, will be substantially the same as in pre-existing practice with photographic spectrographs. With a given sample excited and with the amplifier and integrator controls set at random, each photocell channel (amplifier, integrator, trigger, counter) will, in general, record a random number of counts. If the exposure were repeated under the same conditions and for the same length of time, it would be expected that each channel would again record the same number of counts, except for random variations. The controls on the aluminum line channel are then adjusted by trial and error until the average number of counts will be some even number, such as 500 or 1000, the upper limit of this value being determined by the fact that the counter should not be operating at a rate too near its maximum, and the lower limit being dependent upon the permissible error. Thus, if the lower limit is 200 there will be a maximum error of ½ per cent if a count is missed at either the beginning or the end of an exposure. The controls on the copper channel are likewise adjusted so that a variation in copper content of the sample yields a practicable variation in the number of counts. The sample to be analyzed is then excited and when the counter of the aluminum channel has counted the predetermined number, say 500 or 1000, the circuits are opened. The copper content of these alloys will be related by a linear, or at least by some regular, function to the number of counts so that by analyzing a series of samples of known copper content the dial of the copper channel counter can be calibrated to read directly in percentage of copper when the aluminum counter has counted its predetermined number of counts.

In this way direct readings may be had in a very few minutes, which is a small fraction of the time required by photographic methods. Thus, our invention extends the utility of spectrographic analysis, as by making it highly useful for control work, e. g., in alloy production, where rapidity of analysis is vital. All the more is this the case because the results can be read directly from calibrated dials, and persons of no technical training or experience can perform routine analyses easily once the instrument has been calibrated for such work.

One means for automatically stopping operation when the standard has counted the predetermined number of impulses is shown in Fig. 9. Rotor 54 rotates shaft 55 on which a worm 64 is keyed. Worm 64 in turn rotates a worm wheel 65 mounted on a shaft 66 which also carries a cam 67 and a dial 68. Cam 67 is provided with a notch 69 and riding on its periphery is a cam follower 70 which controls the position of a contact spring 71 with respect to a second contact spring 72 in the power supply circuit. When cam follower 70 lies in the notch 69, contact spring 71 is in its lower position and the circuit between contact spring 71 and contact spring 72 is open. When cam 67 is rotated so that cam follower 70 is lifted out of notch 69, spring 71 is also lifted and an electrical circuit is completed, between contact springs 71 and 72. Cam 67 is positioned on shaft 66 so that its notch is aligned, with respect to dial 68, so that the circuit between contact springs 71 and 72 is closed at any dial reading between 0 and the full scale reading but is abruptly opened when shaft 66 rotates dial 68 just past the full scale reading position.

The functioning of this component of the entire structure then is as follows. Before the start of a determination, shaft 66 is manually rotated until dial 68 reads 0 on its index 74. This, of course, rotates cam 67 to a position where cam follower 70, and hence contact spring 71, are in the raised position. The circuit between contact springs 71 and 72 is thus completed. In order that worm wheel 65, in mesh with worm 64, will not prevent such preliminary setting, due to the well known fact that a worm wheel of normal pitch cannot rotate a matching worm, a slip clutch 73 is provided between shaft 66 and worm wheel 65. With dial 68 set at zero and cam 67 set to complete circuit 71—72, the run is started. Rotor 54 rotates as a function of energy received at the standard line electron multiplier 9. When sufficient energy has been received at standard electron multiplier 9, dial 68 will have rotated to a position just past the full scale reading and cam follower 70 will have dropped into notch 69, which opens circuit 71—72 and, through any appropriate electric circuit, stops further operation of all counters, including the standard line one, by interrupting the power supply to them. The ratio of energy received at any other electron multiplier to that received at the standard multiplier will then be indicated by the extent of rotation of the dial of that second multiplier rotor, since the standard rotor always rotates a standard number of revolutions.

Various modifications are, of course, permissible and will occur to those skilled in the art. For example, the excitation of the sample can be controlled manually or automatically, and likewise the standard counter may be used for control, as by providing a cam which at the prescribed number of counts operates a micro-switch to open the various power circuits, or such control may be achieved otherwise or even be manual. Likewise, the invention is not limited to determining a single constituent although it was described for simplicity with reference to determining copper in an aluminum-base alloy containing copper; the same principle and mode of operation applies to more complex systems. Thus, Fig. 1 shows three photo-cell channels, and Fig. 3 shows four.

If for any reason it is necessary to measure lines closer together than is possible with the foregoing construction, this may be done by means of two mirrors 60 with their surfaces forming an angle of 90° and set closer to the grating than the focal surface in such a position that each mirror makes a 45° angle with the optical axis. These mirrors effectively split part of the focal surface into two parts, each being half the size of the part of the original surface which is obstructed by the mirrors. Tracks comparable to track 18 can then be set along each of the two new focal surfaces, and photocells 9a and 9b, Figs. 10 and 11, held in carriages comparable to carriages 16 can be positioned to receive energy in beams 61 and 62, respectively. These beams can be as close together in wave length as need be, or even identical.

No claim is made herein to the combination with spectrographic apparatus of means associated with one of the counting, or indicating, means for rendering all of the counting means inoperative when it indicates a predetermined value in response to the photocell with which it is associated, this being the subject matter of claims in a co-pending application, Serial No. 535,157, now Patent 2,436,104, filed May 11, 1944, by Aiken W. Fisher and William B. Warren and assigned to the owner of the present application.

Likewise, no claim is made herein to the counter unit described with reference to Fig. 8, this being claimed in a co-pending application, Serial No. 679,531, filed June 26, 1946, by one of the present applicants, Edwin R. Millen, and also assigned to the assignee of this application.

According to the provisions of the patent statutes, we have explained the principle, construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a spectrograph, the combination of means for excitation of a sample, a spherical grating, a member having a slit disposed between said sample exciting means and said grating and closer to said grating than its Rowland circle position, said sample exciting means, grating and slit being disposed in a substantially vertical plane, at least two line-selecting members disposed on the focal surface of said grating and adjustable over said surface for selecting and passing individually predetermined relatively narrow bands of spectral energy received at said surface from said grating, and an electron multiplier photocell associated with each of said selecting members for movement therewith and for receiving energy passed by the member, and an electric circuit associated with each of said photocells for measuring the intensity of light energy passed to it.

2. A spectrograph according to claim 1, said electric circuit including a voltage regulator unit supplying said photo-cells and comprising a transformer adapted to be connected to a voltage source, a rectifier tube connected to the high voltage side of said transformer, series-connected taps for connection to said multiplier cell, connections between the output of said rectifier tube and the end members of said taps, a filter condenser in parallel across said output, a voltage regulator tube in series with the output of said rectifier tube, a high gain voltage amplifier tube connected to said regulator tube and to an intermediate member of said taps, a resistance connected in series with the plate of said amplifier tube and the output connection, and a second voltage regulator tube in series with said taps at said intermediate point, whereby a change in voltage at said voltage source causes the grid bias and plate current of said voltage amplifier tube to change and correspondingly to change the grid bias of said voltage regulator tube to counteract the change at said voltage source.

3. In a spectrograph, the combination of means for excitation of a sample, a light-dispersing means, a member having a slit disposed between said sample and light-dispersing means, at least two line-selecting members disposed on the focal surface of said light-dispersing means and adjustable over said surface for selecting and passing individually predetermined narrow bands of spectral energy received at said surface from said light-dispersing means, a photocell associated with each of said selecting members for movement therewith and for receiving energy passed by the member, an electric circuit associated with each of said photocells for measuring the intensity of light passed to it and comprising an alternating current amplifier, the gain of which can be varied to provide changes in sensitivity, an integrator unit receiving the output of said amplifier and delivering pulsating output, and counting means actuated by said integrator to indicate the number of pulsations transmitted by the integrator, said integrator including means for controlling the minimum percentage of element at which it actuates the counting means.

4. A spectrograph according to claim 3, said light-dispersing means being a spherical grating.

5. A spectrograph according to claim 3, said integrator unit comprising a transformer connected on one side to said amplifier and at the other side to a rectifier tube, a resistor and a condenser in parallel with the output of said tube, a second resistor in series with the plate of said tube and one side of a neon tube the other side of which is connected to the cathode of said rectifier tube, a second condenser shunted across said neon tube and acting with said second resistor as a relaxation oscillator whose output frequency varies as a direct function of the voltage across the resistor and condenser in parallel with the output of said rectifier tube, regulator tube connected on one side to said second condenser and the plate of said rectifier tube and on the other side to said neon tube, a variable resistor between said voltage regulator tube and said neon tube to vary the biasing potential applied to the neon tube, and means connecting said neon tube and counter for indicating the pulsations of the integrator output.

6. In a spectrograph, the combination of means for excitation of a sample, a light-dispersing means, a member having a slit disposed between said sample and light-dispersing means, at least two line-selecting members disposed on the focal surface of said light-dispersing means and adjustable over said surface for selecting and passing individually predetermined narrow bands of spectral energy received at said surface from said light-dispersing means, an electron multiplier photocell associated with each of said selecting members for movement therewith and for receiving energy passed by the member, an electric circuit associated with each of said photo-cells for measuring the intensity of light passed by its selecting member and comprising an alternating current amplifier, the gain of which can be varied to provide changes in sensitivity, an integrator unit receiving the output of said amplifier and delivering pulsating output, a pair of gas filled triodes which are alternately caused by the pulsations from said integrator unit to be alternately energized, means for varying the minimum striking potential of said integrator unit to control its range of operation, and a counting means operated by said triodes to indicate the number of pulses of said integrator unit.

JOSEPH GEFFNER.
EDWIN R. MILLEN.

REFERENCES CITED

The following references are of record in the file of this patent:

UNITED STATES PATENTS

| Number | Name | Date |
|---|---|---|
| 2,002,546 | Muller et al. | May 28, 1935 |
| 2,232,373 | Dorst | Feb. 18, 1941 |
| 2,279,646 | Smith | Apr. 14, 1942 |

FOREIGN PATENTS

| Number | Country | Date |
|---|---|---|
| 664,233 | Germany | Aug. 24, 1938 |

OTHER REFERENCES

Journal of the Optical Society of America, vol. 32, No. 1; pages 8 to 24.